United States Patent [19]

Jones

[11] Patent Number: 4,903,372
[45] Date of Patent: Feb. 27, 1990

[54] PORTABLE DEER POLE

[76] Inventor: Carl E. Jones, Rt. 2, Box 2635, Fitzgerald, Ga. 31750

[21] Appl. No.: 215,999

[22] Filed: Jul. 7, 1988

[51] Int. Cl.⁴ .............................................. A22B 1/00
[52] U.S. Cl. ...................................... 17/44.2; 294/79; 254/325
[58] Field of Search ..................... 17/44.2, 44; 294/79; 254/325; 212/182, 187, 252, 254; 414/462

[56] References Cited

U.S. PATENT DOCUMENTS

| 2,630,334 | 3/1953 | Ewers | 254/325 X |
| 3,854,168 | 12/1974 | Bradley | 17/44.2 |
| 3,894,313 | 7/1975 | Miller | 17/44.2 |
| 4,338,703 | 7/1982 | Tanner | 17/44 |
| 4,705,179 | 11/1987 | Lathrom | 212/182 |

Primary Examiner—Frederick R. Schmidt
Assistant Examiner—M. Rachuba
Attorney, Agent, or Firm—Arthur G. Yeager

[57] ABSTRACT

A portable deer pole for releasable attachment to the rear bumper of a pickup truck comprising a substantially vertical boom attachable to the bumper with its upper free end fitted with a pulley and a cable wound on a winch adjacent the lower end with the cable extending over the pulley to a spreader adapted to hold an animal carcass for skinning, and two supporting cable portions attachable at one end to the side panels of a truck and at the other end to the boom adjacent its upper free end.

14 Claims, 3 Drawing Sheets

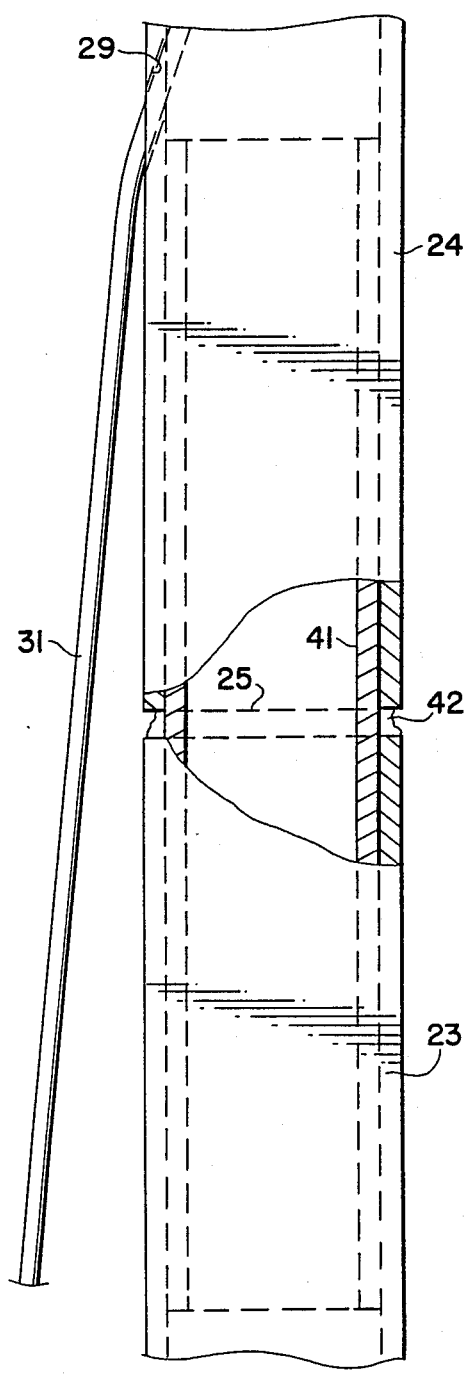
FIG 3
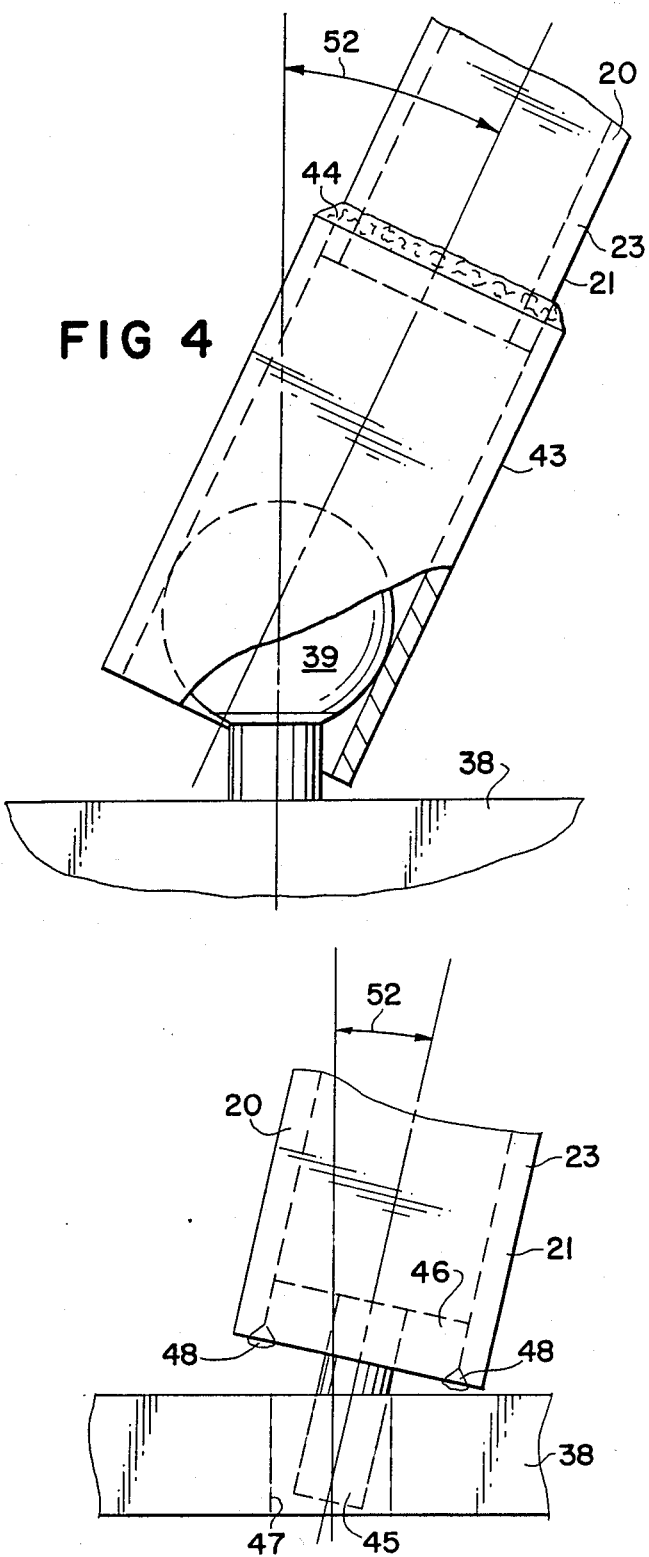
FIG 4
FIG 5

PORTABLE DEER POLE

BACKGROUND OF THE INVENTION

Hunters frequently have a need for a means to hang an animal killed in the hunt and to skin it. For example, a group of deer hunters may wish to use one of the deer for food at the hunting camp, and it is, of course, necessary to skin the carcass before cooking a portion of the meat. Other animals killed in the hunt may be of value only for their fur or hides, and accordingly, it is preferred to skin the carcasses at the camp site and not bring the entire carcass home.

In the past, the hunter has thrown a rope over a tree limb, fastened a spreader to the end of the rope and hung the animal carcass from the spreader. It is, of course, not always possible to find the right tree for this purpose near the camp, and so there has been a need for a portable deer pole which can be readily assembled and attached to a pickup truck which is always near the hunter. The truck can, of course, be used to haul the carcass to whatever place is selected for the skinning operation.

Two prior art patents are known that describe skinning trees that are attachable to a pickup truck. U.S. Pat. No. 3,854,168 to Bradley, shows a telescoping boom with a curved head from which a block and tackle may be suspended to hold a carcass on a spreader. The boom is attachable to a base plate that can be attached to a truck or to the trunk of a tree. U.S. Pat. No. 4,338,703 discloses a vertical mast with a horizontal boom at its upper end which can swivel in any direction. A winch and pulleys on the mast and boom direct a cable to raise or lower the carcass. The mast may be attached to selected portions of a truck.

It is an object of this invention to provide an improved portable deer pole that is attachable to the rear bumper of a pickup truck. It is another object of this invention to provide an improved portable skinning device that is readily disassemblable into parts that are convenient to store and carry in a truck bed. Still other objects will become apparent from the more detailed description which follows.

BRIEF SUMMARY OF THE INVENTION

This invention relates to a portable deer pole for releasable attachment to the rear of a pickup truck wherein the pole includes a boom having a proximal end with means attachable to a rear bumper of a pickup truck and a distal end with a pulley attached thereto. A winch is affixed to the boom spaced above the proximal end thereof. A cable is wound on the winch and extends over a pulley at the distal end and the free end of the cable supports a spreader upon which an animal carcass may be hung for skinning. A pair of elongated supporting cable means are attachable at one end of each cable to the boom and at the other end to the truck.

In a preferred embodiment of this invention several features include a boom lower end attachable to a trailer hitch ball on the rear bumper of the truck; the boom includes two telescopic portions, the apex of the upper boom portion having an angular bend in the middle thereof; and the boom is supported at an angle from the vertical by two cable supports hooked to the boom and hooked to openings in the sides of the truck.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 3 is an enlarged elevational view, partially in cross section, showing the juncture of two pieces of the boom;

FIG. 4 is an enlarged elevational view, partially in cross section, showing the attachment of the boom to a trailer hitch ball; and FIG. 5 is an enlarged elevational view of the lower portion of the boom attached to the truck by a stud loosely fitting in a hole in the truck bumper.

DETAILED DESCRIPTION OF THE INVENTION

The various parts and features of this invention are best shown by reference to the attached drawings.

Figure 1:
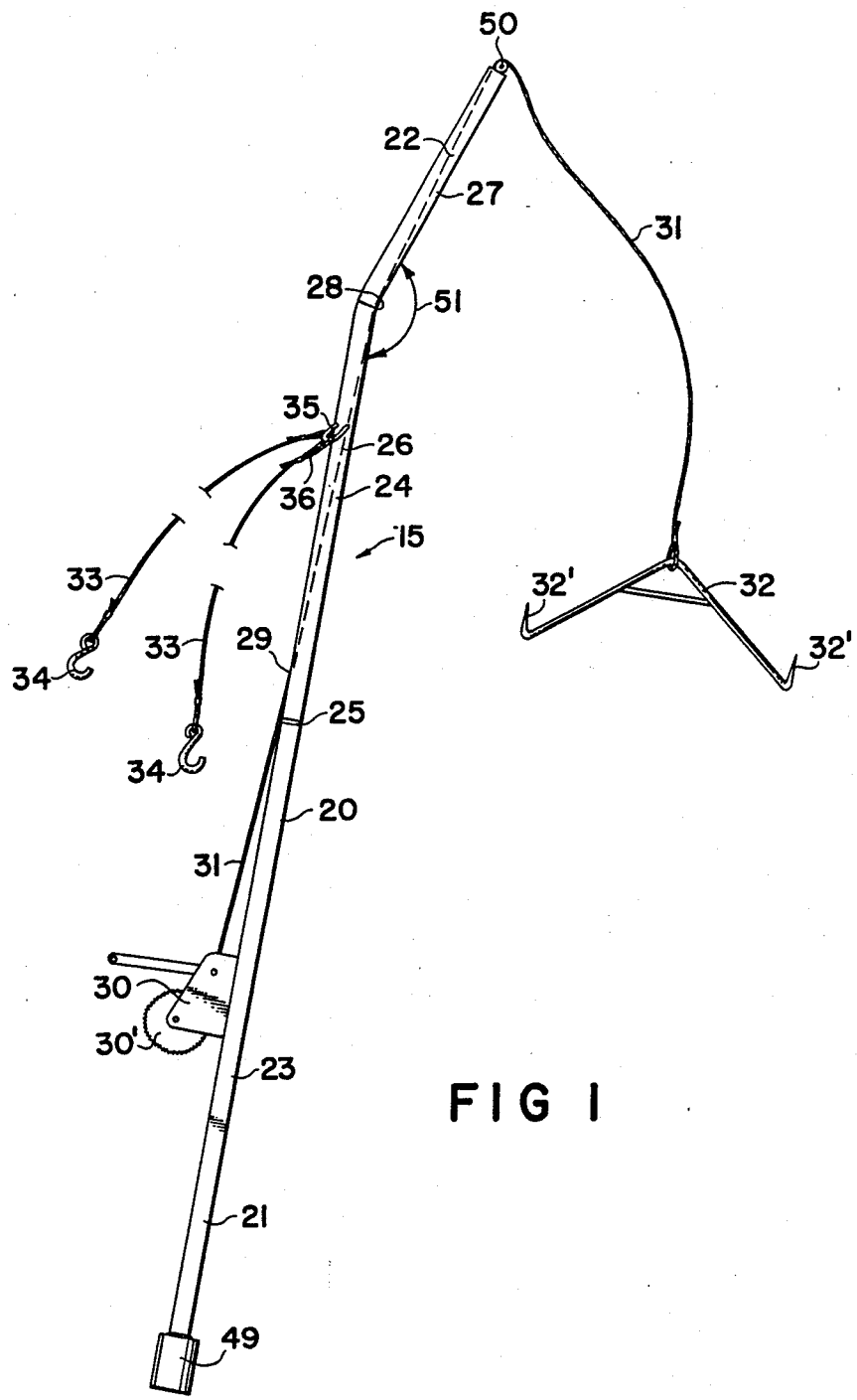
FIG. 1 is a side elevational view of the deer pole of this invention.
Figure 2:
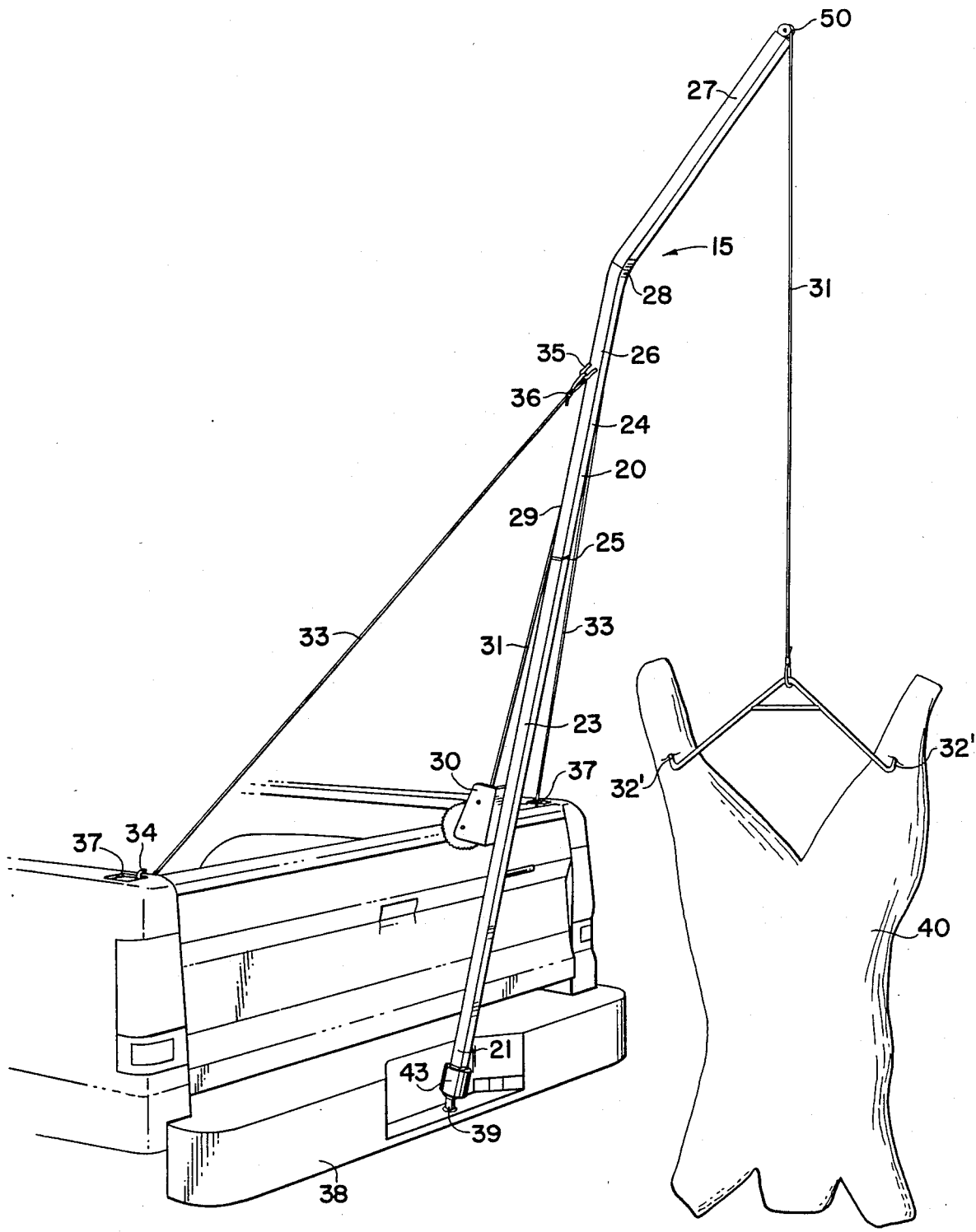
FIG. 2 is a perspective view of the deer pole of this invention attached to the rear bumper of a pickup truck, and suspending an animal carcass therefrom.

In FIGS. 1 and 2 the assembled deer pole is generally designated by numeral 15 and includes a boom 20 which has a proximal end 21 and a distal end 22, and is designed to be positioned in a general upright orientation at a small angle from the vertical. Boom 20 has a lower portion 23 and an upper portion 24 telescopically connected together at juncture 25. This telescopic connection permits boom 20, which may be 8-10 ft. long to be disassembled into two short portions for storage or for travel. Upper portion 24 consists of an outer section 27 and an inner section 26 which are rigidly connected to each other at 28, but angularly disposed with respect to each other with an included angle 51 of about 130° to about 160°.

A hand operated winch 30 is affixed to lower portion 23 of boom 20, and has wound on the drum 30' a length of cable 31 which extends over pulley 50 and downward to a spreader bar 32 having a pair of hooks 32' upon which the animal carcass 40 may be hung. The cable 31 enters small passageway 29 and passes through hollow boom portion 24 and out its open end adjacent pulley 50 and thence over pulley 50 as best seen in FIGS. 1 and 3.

In order to support boom 20 in its upright position a pair of support means in the form of cables 33 extend between the truck and boom 20. At the end of cables 33, attachable to the truck, are S-hooks 34 (closed and welded to form eyelets through which the cable loops fasten thereto) which can be attached to holes 37 in the side panels of the truck. It is apparent that in place of holes 37, eyes may be welded to the side panels, eyebolts may be threadedly attached thereto, or other suitable attachment aids may be employed. Similarly at boom 20, support cables 33 may be attached in a variety of ways. Shown here are eyes of U-bolts 35 affixed to lower section 26 of upper portion 24 of boom 20, with cable loops fastened thereto. This arrangement permanently attaches support cables 33 to upper portion 24 of boom 20. If it is desired to make support cables 33 easily detachable from boom 20, cable loops 36 can be replaced with S-hooks such as those at 34. Still other fasteners well known in the art can be employed for attaching cables 33 to boom 20.

The connection between boom 20 and the pickup truck is preferably made at the rear bumper 38 where there normally is an inset in which a trailer hitch ball 39 is installed. The two preferred options for connecting boom 20 to the truck are shown in FIGS. 4 and 5. In FIG. 4 the rear bumper 38 has a trailer hitch ball 39 affixed thereto. The distal end 21 of lower portion 23 is fitted with a tubular round pipe section 43 which has a slightly larger inside diameter than the outside diameter of ball 39. Preferably section 43 is welded at 44 to the end of, or adjacent the end of, lower portion 23. By using appropriate sizes for section 43, boom 20 may be tilted away from the vertical a suitable amount to serve the purposes of the hunter. The angle of tilt 52 should be at least about 30° from the vertical.

In FIG. 5 there is shown an alternative means for connecting boom 20 to the truck. Distal end 21 is fitted with a plug 46 which preferably is welded to lower portion 23 as at 48. Projecting outwardly and downwardly from plug 46 is a stud 45 which loosely fits into a hole 47 in rear bumper 38. It may be seen that the angle of tilt 52 will depend on the relative sizes of hole 47 and stud 45. This alternative is a simpler arrangement for a pickup truck having no trailer hitch ball 39 but would require drilling of a hole 47 through the bumper approximately equidistant between the side walls of the truck.

In FIG. 3 there is shown a preferred arrangement for the junction of upper portion 24 and lower portion 23 of boom 20. A short length of tubular stock 41, closely fitting the internal shape and dimensions of upper portion 24 and lower portion 23 is welded to lower portion 23 at 42. Upper portion 24 may then be slid on or off of the projecting piece of stock 41 to assemble or to disassemble boom 20. The parting line 25 is the lower edge of upper portion 24.

Preferably boom 20, including lower portion 23, upper portion 24, and inside section 41, are made of nonround tube or pipe, e.g., rectangular or square tube or pipe. This prevents any turning around the lengthwise axis of boom 20. The material of construction of boom 20 may be metal, such as steel or aluminum, or plastic, such as polyvinyl chloride, polyolefin, or a reinforced plastic material. Cables 31 and 33 are preferably steel cable, although nylon rope or the like may be used as desired.

It should be apparent that this portable deer pole may be disassembled into short sections of pipe and wire cable which can readily be stored or carried in the truck bed.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A portable disassemblable deer pole for releasable attachment to a rear portion of a pickup truck comprising an elongated tubular boom having separate proximal and distal end portions connected to each other to form said boom, connecting means secured to said proximal end portion for attaching said boom to a rear bumper of a pickup truck, a pulley attached to said distal end, a winch outwardly affixed to said proximal end portion of said boom spaced above said connecting means, a first passageway through said distal end portion generally above and adjacent said winch, a cable windable on said winch and extending through said first passageway and through the hollow of said distal end portion and out a second passageway to a free end extending over and engaging said pulley whereby said cable extends outwardly of said boom below said first passageway and inwardly of said boom above said first passageway to enable ready disassembly of said distal end portion from said proximal end portion, a spreader being attached to said free end of said cable upon which an animal carcass may be hung for skinning, said support means attachable at one end to said distal end portion and attachable at the other end to said truck.

2. The deer pole of claim 1 wherein said proximal end portion of said boom includes a tubular coupling member adapted to fit over a trailer ball hitch on a rear bumper of a truck.

3. The deer pole of claim 1 wherein said proximal end portion of said boom includes an elongated stud adapted to fit loosely in a corresponding hole in a rear bumper of a truck.

4. The deer pole of claim 1 wherein said boom is formed of rectangular tubular stock.

5. The deer pole of claim 1 wherein said boom adjacent said distal end portion is formed of two linear sections angularly disposed with respect to each other.

6. The deer pole of claim 5 wherein said two linear sections are disposed at an angle of about 130° to about 160° with respect to each other.

7. The deer pole of claim 1 wherein said support means includes a pair of cables each attachable at one end to said distal end portion and at the other end having a hook for attachment to a side panel of said truck.

8. The deer pole of claim 1 wherein said boom is formed of two sections, slidingly couplable to each other.

9. A portable disassemblable deer pole releasably attached to a rear bumper of a pickup truck comprising a two-section telescopic boom having a proximal end portion and a distal end portion, means for pivotal attachment of said proximal end portion to a rear bumper, a pulley affixed to said distal end portion, said boom including a single linear section of a hollow rectangular tubular material extending from said proximal end to the telescopic junction of the two sections, and an annular linear section of rectangular tubular material having a lower end which telescopically slides over the outside of said single linear section at said junction and an upper end forming said distal end with said pulley attached thereto, a hand operable winch mounted on and outwardly of said single linear section, a first passageway extending through a wall of said annular linear section of said boom generally above and adjacent said winch, a flexible cable wound on said winch, extending through said first passageway and upwardly through the hollow of said boom and out a second passageway at the far end of said annular linear section and over said pulley to a free end whereby said cable extends outwardly of said boom below said first passageway and inwardly of said boom above said first passageway to enable ready disassembly of said annular linear section from said single linear section, a spreader member having a pair of hooks from which an animal carcass may be hung for skinning, said spreader member being attached to said free end of said cable, a pair of flexible cable supports each being attachable at one end adjacent a respective side of a truck and at the other end to said annular linear section of said boom.

10. The deer pole of claim 9 wherein said proximal end of said boom includes a tubular coupler to fit a trailer ball hitch on a rear bumper of a truck.

11. The deer pole of claim 9 wherein said proximal end of said boom includes a stud insertable into a hole in a rear bumper of a truck.

12. The deer pole of claim 9, wherein said angular linear section of said boom includes two linear portions of rectangular tubular material disposed at an angle of about 130°–160° from each other.

13. The deer pole of claim 9 wherein said flexible cable supports each include at least one hook, said one hook being adapted to be attached to a side panel of a truck.

14. The deer pole of claim 13 wherein said one hook on one said cable support is adapted to be attached to a side panel of a truck and said one hook on another said cable support is adapted to be attached to an opposite side panel of a truck adjacent a rear of a truck.

* * * * *